United States Patent
Chen

(10) Patent No.: US 11,418,677 B2
(45) Date of Patent: Aug. 16, 2022

(54) METHOD FOR PREVENTING IMAGE MODIFICATION, IMAGE CAPTURING DEVICE AND IMAGE VERIFICATION METHOD

(71) Applicant: Sigmastar Technology Ltd., Xiamen (CN)

(72) Inventor: Lijing Chen, Shenzhen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 853 days.

(21) Appl. No.: 16/183,864

(22) Filed: Nov. 8, 2018

(65) Prior Publication Data

US 2019/0158698 A1 May 23, 2019

(30) Foreign Application Priority Data

Nov. 23, 2017 (CN) .......................... 201711186235.4

(51) Int. Cl.
| | |
|---|---|
| *H04N 1/32* | (2006.01) |
| *H04N 19/46* | (2014.01) |
| *G06T 1/00* | (2006.01) |
| *H04N 19/85* | (2014.01) |
| *H04N 1/44* | (2006.01) |

(52) U.S. Cl.
CPC ....... *H04N 1/32272* (2013.01); *G06T 1/0021* (2013.01); *H04N 1/32277* (2013.01); *H04N 1/44* (2013.01); *H04N 19/46* (2014.11); *H04N 19/85* (2014.11)

(58) Field of Classification Search
CPC .... H04N 1/32272; H04N 19/46; H04N 19/85; H04N 1/44; H04N 1/32277; G06T 1/0021; H04W 12/10; H04W 12/1008
See application file for complete search history.

(56) References Cited

U.S. PATENT DOCUMENTS

| | | | |
|---|---|---|---|
| 2003/0123701 A1* | 7/2003 | Dorrell | H04N 1/32144 382/100 |
| 2010/0295954 A1* | 11/2010 | Kotani | H04N 5/23248 348/208.4 |
| 2011/0305364 A1* | 12/2011 | Le Barz | G06T 1/0057 382/100 |
| 2014/0153788 A1* | 6/2014 | Ma | G06T 7/73 382/113 |

\* cited by examiner

*Primary Examiner* — Farid Homayounmehr
*Assistant Examiner* — Suman Debnath
(74) *Attorney, Agent, or Firm* — WPAT, PC

(57) ABSTRACT

A method for preventing image modification, an image capturing device and an image verification method are disclosed. The image modification method includes: processing a compressed image of at least one frame to obtain feature data of the compressed image of the at least one frame; encrypting the feature data to generate a checksum; generating supplemental enhancement information, which at least includes a time parameter and the checksum; and transmitting and/or storing the supplemental enhancement information and the compressed image of the at least one frame together so as to verify authenticity of the compressed image of the at least one frame by using the supplemental enhancement information. The time parameter is a counter value of a counter in the image capturing device and the counter value continuously increases. With the above method, authenticity of image data can be verified.

18 Claims, 12 Drawing Sheets

```
┌─────────────────────────────────────────────┐
│ Encrypt time parameter and checksum to generate │──S131
│              ciphertext                     │
└─────────────────────────────────────────────┘
                      │
                      ▼
┌─────────────────────────────────────────────┐
│ Generate supplemental enhancement information │──S132
│            including ciphertext             │
└─────────────────────────────────────────────┘
```

FIG. 8

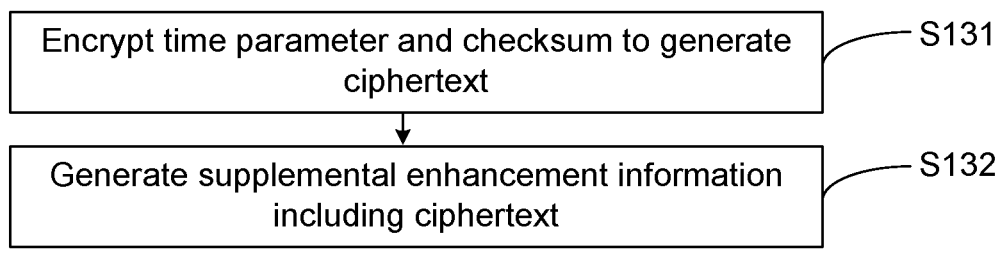

FIG. 9

METHOD FOR PREVENTING IMAGE MODIFICATION, IMAGE CAPTURING DEVICE AND IMAGE VERIFICATION METHOD

This application claims the benefit of China application Serial No. 201711186235.4, filed Nov. 23, 2017, the subject matter of which is incorporated herein by reference.

BACKGROUND OF THE INVENTION

Field of the Invention

The invention relates to a the field of image processing, and more particularly to a method for preventing image modification, an image capturing device and an image verification method.

Description of the Related Art

Security surveillance images can be submitted as evidence to courts. However, image data captured by many security surveillance products conduct only simple compression and storage of the image data captured, and such image data can be easily modified or counterfeited. Further, because of the simple processing performed on the image data, the authenticity of the image data cannot be verified through the image data, which significantly reduces the solidity of such image data serving as legal evidence.

SUMMARY OF THE INVENTION

The primary technical problem to be solved by the present invention is to provide a method for preventing image modification, an image capturing device and an image verification method for resolving the issue of the prior art, in which authenticity of image data cannot be verified.

To resolve the above technical problem, the present invention provides a method for preventing image modification. The method includes: processing compressed image data of at least one frame to obtain feature data of the compressed image of the at least one frame; encrypting the feature data to generate a checksum; generating supplemental enhancement information, which at least includes a time parameter and the checksum; and transmitting and/or storing the additional enhancement and the compressed image of the at least one frame together so as to use the supplemental enhancement information to verify authenticity of the compressed image of the at least one frame; wherein, the time parameter is a counter value of a counter in an image capturing device, and the counter values continuously increases.

To resolve the above technical problem, the present invention further provides an image capturing device. The image capturing device includes: a processor and a counter. The counter is connected to the processor. The processor performs compressed image data of at least one frame to obtain feature data of the compressed image of the at least one frame, encrypts the feature data to generate a checksum, generates supplemental enhancement information that at least includes a time parameter and the checksum, and transmits and/or stores the supplemental enhancement information and the compressed image of the at least one frame together so as to use the supplemental enhancement information to verify authenticity of the compressed image of the at least one frame; wherein, the time parameter is a counter value, and the counter value continuously increases.

To resolve the above technical problem, the present invention further provides an image verification method. The image verification method includes: obtaining compressed images of multiple frames and corresponding enhancement information; detecting whether the supplemental enhancement information satisfies a predetermined condition; and if the supplemental enhancement information satisfies the predetermined condition, determining that the compressed image corresponding to the supplemental enhancement information is authentic; wherein, the time parameter is a counter value of an image capturing device, and the counter value continuously increases.

The present invention provides following effects. Different from the prior art, in embodiments of the present invention, a compressed image of at least one frame is processed to obtain feature data of the compressed image of the at least one frame, the feature data is encrypted to generate a checksum, supplemental enhancement information at least including a time parameter and a checksum is generated, the supplemental enhancement information and the compressed image of the at least one frame are transmitted and/or stored together so as to use the supplemental enhancement information to verify authenticity of the compressed image of the at least one frame. The time parameter is a counter value of a counter in an image capturing device, and the counter value continuously increases. Thus, image verification staff is enabled to verify the authenticity of the image data through verifying the checksum and the time parameter in the supplemental enhancement information.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 8 a flowchart of a method for preventing image modification according to a sixth embodiment of the present invention;

FIG. 9 is a structural schematic diagram of supplemental enhancement information in the method for preventing image modification according to the sixth embodiment of the present invention;

DETAILED DESCRIPTION OF THE INVENTION

The technical solutions of the embodiments of the present invention are described clearly and thoroughly in the description of the embodiments of the present invention with the accompanying drawings below. It should be noted that, the described embodiments are only some embodiments of the present invention rather than all of possible embodiments. On the basis of the embodiments of the present invention, all other embodiments arrived at by a person skilled in the art without any inventive skills are to be encompassed within the protection scope of the present invention.

Figure 1:
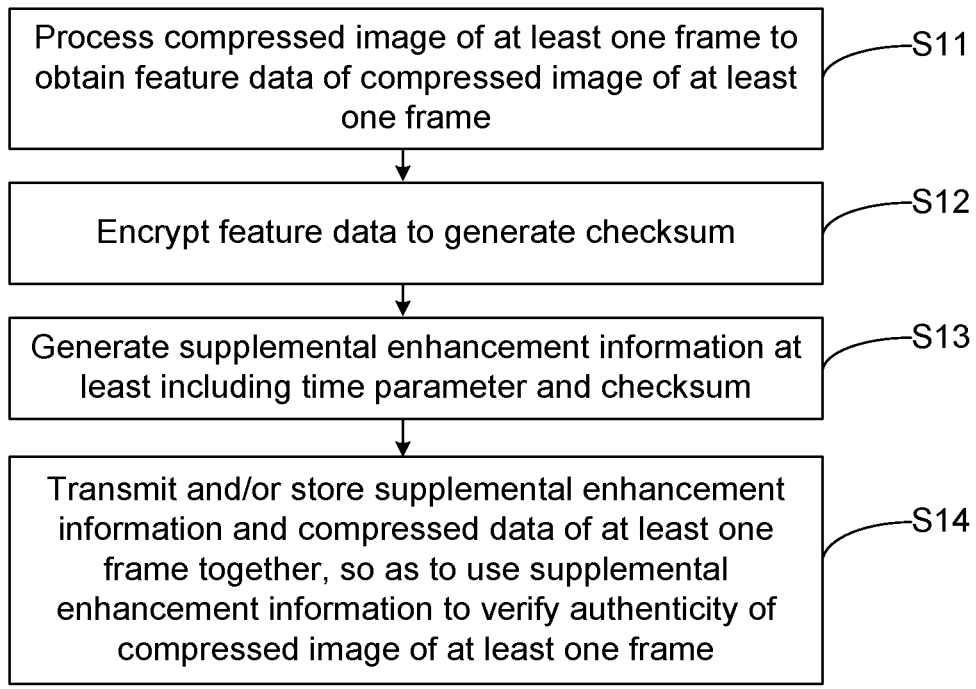
FIG. 1 is a flowchart of a method for preventing image modification according to a first embodiment of the present invention.

As shown in FIG. 1, a method for preventing image modification according to a first embodiment includes the following steps.

In step S11, a compressed image of at least one frame is processed to obtain feature data of the compressed image of the at least one frame.

The compressed image is image data obtained through encoding and compression, and a specific algorithm method may be a method specified by the H.264 or H265 protocol. In other embodiments, methods of other protocols may also be used and are not specifically defined herein.

More specifically, in one application example, an image capturing device captures an image of a frame, and an encoder encodes and compresses the image of the frame, divides the compressed image of the frame to obtain multiple sub-images, e.g., four equally sized sub-images, and extracts features from each of the sub-images, e.g., extracting pixel values of a partial region of each of the sub-images, to obtain features data of the compressed image of the frame. The compressed image of the frame may also be equally divided or non-equally divided, and is not specifically defined herein. In other application examples, feature data at different positions may also be directly extracted from a compressed image of a frame, compressed images of multiple frames may be processed to obtain feature data at different positions in the compressed images of each of the frames, or correlation feature data among different compressed image may be extracted; the present invention is not limited to the above examples.

In step S12, the feature data is encrypted to generate a checksum.

The encryption algorithm adopted for encrypting the feature data can be a hash algorithm or other types of symmetric/asymmetric algorithm, and is not specifically defined herein.

More specifically, in the above application example, after the feature data of each sub-image of the compressed image of the frame is obtained, each set of feature data can be encrypted, for example, by using a hash algorithm, to generate one hash value of each set of feature data, and the generated hash values are sorted to generate the checksum. In other applications examples, multiple hash values may also be randomly arranged or be arranged according to a predetermined order, and are not specifically limited therein.

In step S13, supplemental enhancement information is generated, wherein the supplemental enhancement information at least includes a time parameter and a checksum.

The time parameter is a counter value of a counter in the image capturing device, and the counter value continuously increases. The time parameter records the order and time (in seconds) of each frame captured by the image capturing device, and is independent from the sequence number of a package of each frame or the video timestamp of the image capturing device and thus cannot be modified by a common image processing process.

More specifically, in one application example, the time parameter increases as the number of image frames of captured by the image capturing device increases. For example, the counter value increases by one each time the image of one frame is captured, such that the time parameter of compressed images of multiple consecutive frames continuously increases. The counter value may also be configured to increase by a predetermined value each time, e.g., by two or by three.

In this embodiment, the time parameter and the checksum of the feature data of the compressed image are encrypted to generate the supplemental enhancement information. For example, the time parameter and the checksum are ordered according to sequences and combined to generate the supplemental enhancement information; alternatively, the time parameter and the checksum are together encrypted, and the encrypted data is then utilized as the supplemental enhancement information.

In other embodiments, the supplemental enhancement information may further include information such as the type of an identity encryption algorithm and a data format of the supplemental enhancement information (SEI), as well as other data such as customer identity, wherein the customer identity may be configured according to customer requirements and is not specifically defined herein.

In step S14, the supplemental enhancement information and the compressed image of the at least one frame are transmitted and/or stored together so as to utilize the supplemental enhancement information to verify the authenticity of the compressed image of the at least one frame.

More specifically, when a set of supplemental enhancement information is generated for a compressed image of one frame or compressed images of multiple frames, while the compressed image data is transmitted and/or stored, the supplemental enhancement information is together transmitted and/or stored. For example, during data transmission, a package of a compressed image of one frame is followed by a package of the supplemental enhancement information.

To verify the authenticity of the compressed image, a receiver can obtain the compressed image data of multiple frames and the supplemental enhancement information, and obtain the time parameter and the checksum from the supplemental enhancement information. Because the time parameter is from the counter value of a counter and continuously increases, and is not a display time of a capturing device, the time parameter cannot be adjusted by configuring the display time of the capturing device; that is to say, the time parameter cannot be modified. Therefore, if the time parameter continuously increases, e.g., consecutively increases along with the frame number of images, it means that the images of the multiple frames are images consecutively captured. Meanwhile, the same method as that used at a transmitting end is used to extract the feature data of the compressed image received and a checksum thereof is calculated, and it means that the authenticity of the compressed image is more likely reliable if the calculated checksum is consistent with the checksum in the supplemental enhancement information.

In other embodiments, the supplemental enhancement information may further at least include size information of the compressed image of the at least one frame and the identity of the image capturing code. The size information represents a storage space needed and occupied by the compressed image of the at least one frame, and the identity of the image capturing device is an identity for distinguishing different capturing devices, e.g., a chip identity. While verifying the authenticity of the compressed image, it is determined whether the size of the compressed image received is consistent with the size information of the compressed image of the at least one frame; if not, it is possible that the data is lost data or the image has been modified. Further, with the identity of the image capturing device obtained, the image capturing device that captured the image data can be traced.

In this embodiment, the compressed image of the at least one frame is processed to obtain the feature data of the compressed image of at least one frame; the feature data is encrypted to generate a checksum; supplemental enhancement information is generated, wherein the supplemental enhancement information at least includes a time parameter and the checksum; the supplemental enhancement information and the compressed image of the at least one frame are transmitted and/or stored together so as to use the supplemental enhancement information to verify the authenticity of the compressed image of the least one frame. The time parameter is a counter value of a counter in an image capturing device and the counter value continuously increases, so as to enable verification staff to verify the authenticity of the image data through verifying the checksum and the time parameter in the supplemental enhancement information.

Figure 2:
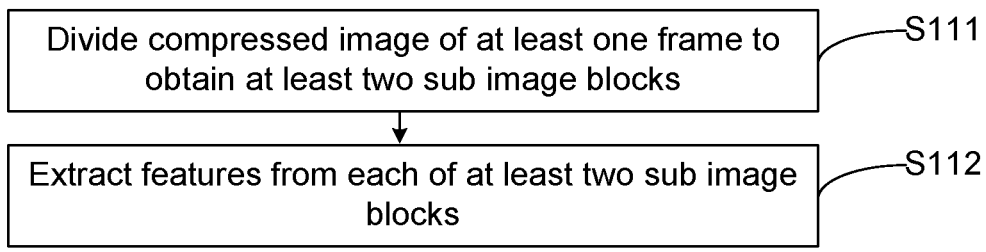
FIG. 2 is a flowchart of a method for preventing image modification according to a second embodiment of the present invention.

As shown in FIG. 2, a method for preventing image modification according to a second embodiment of the present invention is based on the method for preventing image modification according to the first embodiment of the present invention. In this embodiment, step S12 further includes the following steps.

In step S111, the compressed image of the at least one frame is divided to obtain at least two sub image blocks.

More specifically, in one application example, a compressed image of a frame can be equally divided, e.g., dividing a compressed image of a frame into four equally sized sub image blocks; the term "size" represents the storage space needed and occupied by the image data, e.g., 128 bytes. A compressed image of one frame is a segment of data stream, the size of the compressed image of the frame is the storage space needed and occupied by the segment of data stream, and each sub image block is a part of the segment of data stream. In this application example, the first byte of a compressed image of one frame may be used as a dividing starting point so divide the compressed image of the frame equally into multiple (e.g., four) sub image blocks, and the size of each image block is one-quarter of the size of the compressed image of the frame.

In other application examples, the last byte of a compressed image of one frame may also be used as a dividing starting point, and the compressed image of the frame may also be non-equally divided; for example, and equal sizes is used as a basis and is increased/decreased by an offset, or compressed images of multiple frames may be regarded as a whole and then equally or non-equally divided, and is not specifically defined herein.

In step S112, feature data of the at least two sub image blocks is extracted.

In the above application example, a compressed image of one frame is divided to obtain four sub image blocks, and feature extraction is performed on each of the sub image blocks, e.g., feature extraction is performed on a consecutive segment of data stream or on several discrete data points to obtain the feature data of each of the sub image blocks, i.e., the feature data of the compressed image of the frame. Alternatively, regarding the feature extraction, features may be extracted from multiple discrete segments of data stream, and the same feature extraction method or different feature extraction methods may be used for the sub image blocks; the present invention is not limited to the above examples.

In other embodiments, the data of multiple sub image blocks are compared or combined to generate correlation feature data.

Figure 3:
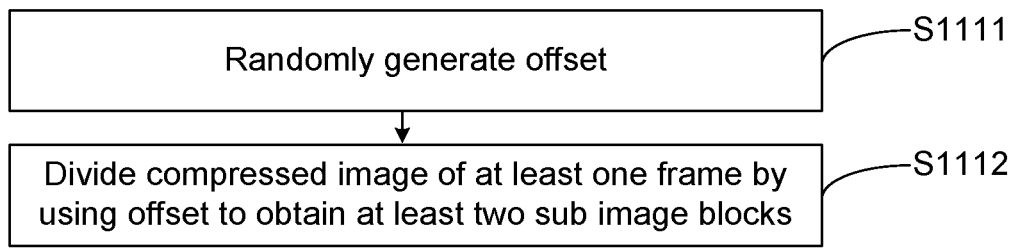
FIG. 3 is a flowchart of a method for preventing image modification according to a third embodiment of the present invention.

As shown in FIG. 3, a method for preventing image modification according to a third embodiment of the present invention is based on the method for preventing image modification according to the second embodiment of the present invention. In this embodiment, step S111 further includes the following steps.

In step S1111, an offset is generated.

The offset may be generated, for example but not limited to, through a random function "rand( )", or through a random number generator.

In step S1112, the compressed image of the at least one frame is divided by using the offset to obtain the at least two sub image blocks.

The at least two sub image blocks include a first sub image block and a second sub image block, and the size of the first sub image block is greater than that of the second sub image block by a predetermined number of the offset.

Figure 4:
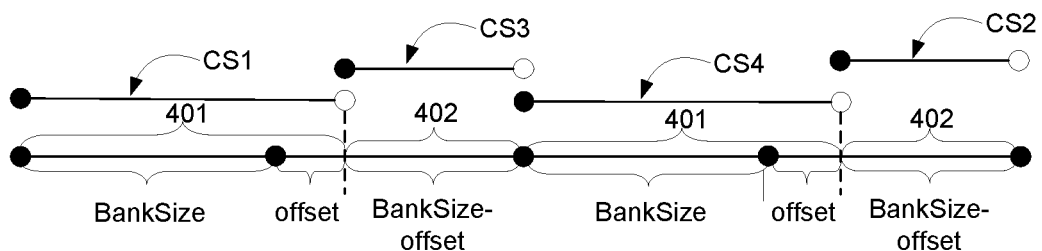
FIG. 4 is a schematic diagram of dividing a compressed image by using an offset in step S1112 in FIG. 3.

More specifically, with reference to FIG. 4, in one application example, after a compressed image of one frame is divided into four equally sized basic blocks (BankSize), the first byte (pCFDStart) of the compressed image of the frame is regarded as a starting point, and the compressed image of the frame is divided on the basis of the basic block into a first sub image block 401 and a second sub image block 402. The size of the offset is smaller than the size of the basic block (BankSize), the size of the first sub image block 401 is that of the basic block increased by one offset, and the size of second image block 402 is that of the basic block decreased by one offset. Alternatively, in this application example, the last byte (pCFDEnd) of the compressed image of the frame may also be used as a starting point, the size of the first sub image block 401 is that of the basic block increased by multiple offsets, and the size of second image block 402 is that of the basic block decreased by multiple offsets; the present invention is not limited to the above examples.

The supplemental enhancement information (SEI) may include the offset. To verify the authenticity of the compressed image, after the compressed image is received, the compressed image may be divided according to the offset by a method same as that used at the transmitting end, so as to obtain the feature data of the divided sub image blocks.

In other application examples, compressed images of multiple frames may also be regarded as whole and then divided, and details for dividing the compressed images of the multiple frames are the same as that for dividing the compressed image of one frame above and are not specifically defined herein.

In this embodiment, the randomly generated offset may be used such that the positions for dividing compressed images each time are also random.

Figure 5:
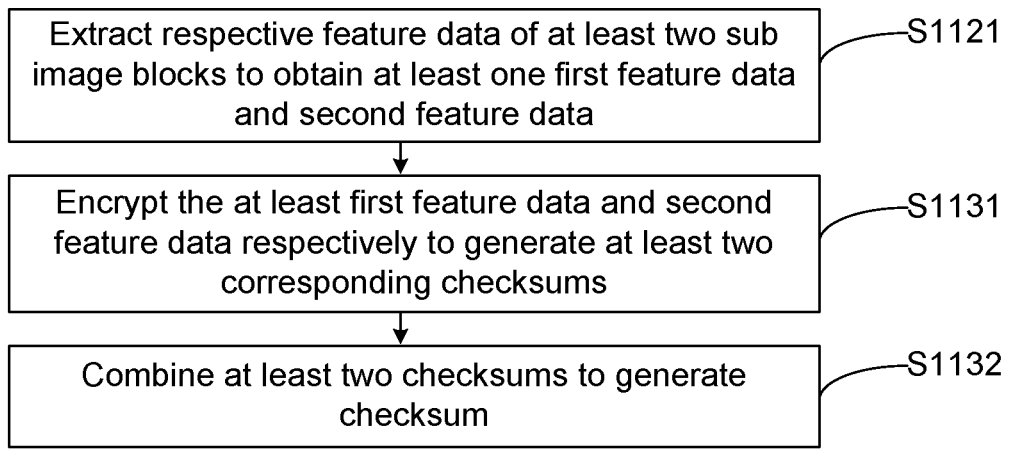
FIG. 5 is a flowchart of a method for preventing image modification according to a fourth embodiment of the present invention.

As shown in FIG. 5, a method for preventing image modification according to a fourth embodiment of the present invention is based on the method for preventing image modification according to the second embodiment of the present invention. In this embodiment, step S1112 further includes the following steps.

In step S1121, the feature data of the at least two sub image blocks is extracted to obtain at least first feature data and second feature data.

The feature data is a part of the data in the sub image blocks, e.g., a part of consecutive data stream, a part of discrete data points at multiple specific positions, or a part of data randomly selected. The extraction method may be determined according to actual requirements, and is not specifically defined herein.

More specifically, with reference to FIG. 4, in one embodiment, after a compressed image of one frame is divided into four sub image blocks, i.e., two first sub image blocks 401 and two second sub image blocks 402, feature data is extracted from each of the sub image blocks to obtain four sets of feature data. The method for extracting the features of the sub image blocks may be the same or different, and is not specifically defined herein.

In other embodiments, compressed images of multiple frames may be regarded as a whole and divided to obtain multiple sub image blocks, and features of each of the sub image blocks are extract to obtain the feature data, wherein the feature data may also be correlation feature data among multiple sub image blocks.

Selectively, step S113 further includes the following steps.

In step S1131, the at least first feature data and second feature data are respectively encrypted to obtain at least two corresponding checksums.

The algorithm for encrypting the feature data may be a message digest algorithm 5 (MD5), i.e., a hash algorithm, or may be other types of algorithms and is not specifically defined herein.

More specifically, with reference to FIG. 4, in the above application example, after four sets of feature data are obtained, the MD5 algorithm may be adopted to respectively encrypt the four sets feature data to obtain four hash values, i.e., four checksums CS1 to CS4, wherein CS1 and CS4 correspond to the feature data of the first sub image blocks 401, and CS2 and CS3 correspond to the feature data of the second sub image blocks 402. The non-sequential order corresponding method used here instead of a common sequential order corresponding method further enhances the performance for preventing modification.

In other application examples, CS1 and CS4 may also correspond to the second sub image blocks, and CS2 and CS3 may correspond to the first sub image blocks; alternatively, CS1 and CS2 may correspond to the second image blocks, and CS3 and CS4 may correspond to the first image blocks; the corresponding method is not specifically defined herein.

In step S1132, a checksum is generated by combining the at least checksums.

More specifically, in the above application example, the four checksums CS1 to CS4 obtained are sequentially ordered to generate one checksum, i.e., the checksum of the compressed image of the at least one frame. In other application examples, the multiple checksums may also be non-sequentially ordered, and are not specifically defined herein.

To verify the authenticity of the compressed image of the at least one frame, the checksum of the compressed image received is calculated and is compared with the checksum in the supplemental enhancement information, e.g., compared to the checksums CS1 to CS4. If the checksums CS1 to CS4 are all consistent, it means the compressed image received is more likely to be authentic; if any one of the checksums is incorrect, it means that it is likely that the compressed image received has been modified.

In other embodiments, feature extraction can be performed on predetermined sub image blocks selected from the sub image blocks obtained from dividing the compressed images of multiple frames.

Figure 6:
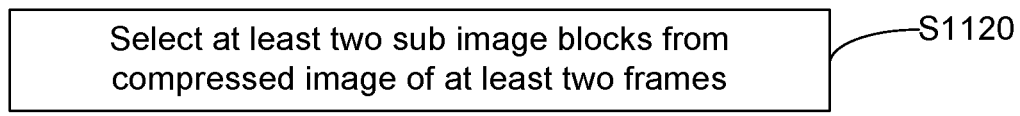
FIG. 6 is a flowchart of a method for preventing image modification according to a fifth embodiment of the present invention.

As shown in FIG. 6, a method for preventing image modification according to a fifth embodiment of the present invention is based on the method for preventing image modification according to the fourth embodiment of the present invention. In this embodiment, the method for preventing image modification further includes following steps before step S1121.

In step S1120, at least two sub image blocks are selected from compressed images of at least two frames.

Figure 7:
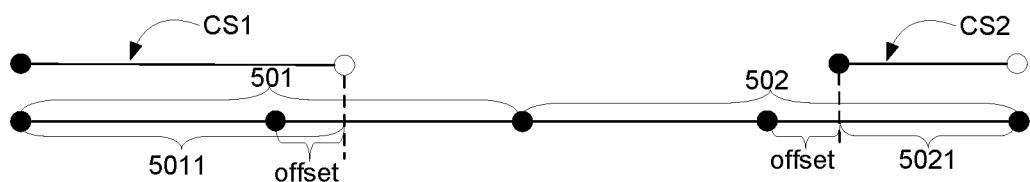
FIG. 7 is a schematic diagram of selecting sub image blocks from compressed images of multiple frames in step S1120 in FIG. 6.

More specifically, referring to FIG. 7, in one application example, compressed images 501 and 502 of two frames are respectively divided into two sub image blocks, and the method for dividing the compressed image are the same and can be referred from steps S1111 and S1112 and are thus omitted herein. A first sub image block 5011 of the compressed image 501 and a second sub image block 5021 of the compressed image 502 are selected so as to extract features respectively from the first sub image block 5011 and the second sub image block 5012. Details of the image extraction may be referred from step S1131 and are omitted herein.

In other embodiments, compressed images of three frames or even more frames may be together divided to obtain multiple sub image blocks, and at least two sub image blocks are selected therefrom. The at least two sub image blocks may be from compressed images of different frames or may be from a compressed image of the same frame, and is not specifically defined herein.

As shown in FIG. 8, a method for preventing image modification according to a sixth embodiment of the present invention is based on the method for preventing image modification according to the first embodiment of the present invention. In this embodiment, step S13 further includes the following steps.

In step S131, the time parameter and the checksum are encrypted to generate ciphertext.

The method for encrypting the time parameter and the checksum may be an MD5 algorithm, or a symmetric or asymmetric algorithm such as data encryption standard (DES) and Rivest-Shamir-Adleman (RSA). The encryption method may be the same as or different from the encryption method for generating the checksum, and is not specifically defined herein.

In step S132, the supplemental enhancement information is generated, wherein the supplemental enhancement information includes the ciphertext.

More specifically, in one application example, the time parameter is obtained by acquiring the counter value of a counter in the image capturing device. The counter starts counting when the image capturing device is turned on, and increases by one each time an image of one frame is captured; that is to say, the counter value continuously increases and only stops counting when the image capturing device is turned off.

When the checksum corresponds to a compressed image of one frame, the time parameter is a value, e.g., 20; when the checksum corresponds to compressed images of multiple frames, for example, compressed images of two frames, the time parameter is a number sequence or a set, e.g., {20, 21}.

Encrypted ciphertext is generated after the time parameter and the checksum are encrypted by using the encryption algorithm, wherein the ciphertext is the supplemental enhancement information.

In other embodiments, the supplemental enhancement information (SEI) may include other information, such as version information or a customer identity, and the other information may also be encrypted together to generate the supplemental enhancement information and is not specifically defined herein.

As shown in FIG. 9, in addition to the time parameter TS (timestamp) and the checksum, the supplemental enhancement information may further include version information V, a customer identity (CID), corresponding size information (compressed frame data size, CFDS) of a compressed image of at least one frame, an offset (bank size offset, BSO), and a unique identity (UID) of the image capturing device, wherein the checksum includes multiple checksums (CS). The version information V needs to occupy a 3-bit storage space, the BSO needs to occupy a 5-bit storage space, the CFDS needs to occupy a 3-byte storage space, the TS needs to occupy a 4-byte storage space, each CS among CS1 to CS4 needs to occupy a 6-byte storage spaces, and the UID and the CID need to respectively occupy a 6-byte storage space. Hence, the entire supplemental enhancement information SEI needs to occupy a 44-byte storage space. Assuming that one set of supplemental enhancement information SEI is calculated for each frame according to a 30 fps frame rate and a 512 Kbps image code rate, the expense caused by the supplemental enhancement information SEI is 44*8*30/512000=2%; that is to say, the supplemental enhancement information does not cause a large load on image transmission or broadcasting.

In other embodiments, the storage space needed and occupied by the supplemental enhancement information may be adjusted according to actual conditions, and is not specifically defined herein.

This embodiment may further be combined with the method for preventing image modification of any one of the methods according to the second to fifth embodiments or with any other non-conflicting combination thereof.

Figure 10:
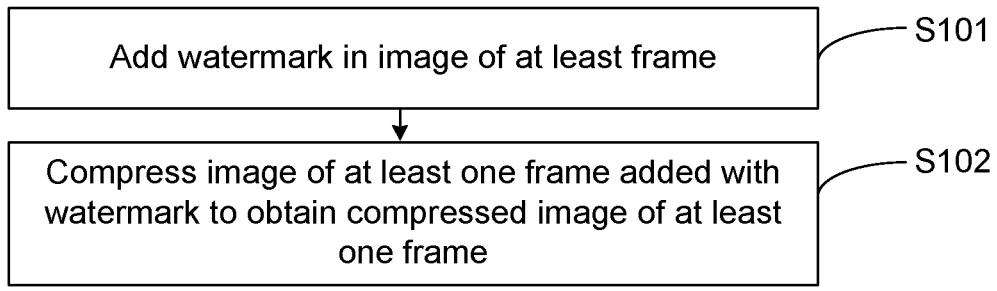
FIG. 10 is a flowchart of a method for preventing image modification according to a seventh embodiment of the present invention.

As shown in FIG. 10, a method for preventing image modification according to a seventh embodiment of the present invention is based on the method for preventing image modification according to the first embodiment of the present invention. In this embodiment, the method for preventing image modification further includes the following steps before step S11.

In step S101, a watermark is added in an image of at least one frame.

The watermark includes an identity and a time parameter of an image capturing device. The time parameter is a counter value of a counter in the image capturing device and the counter value continuously increases. The time parameter records the order and time (in seconds) of each frame captured by the image capturing device, and is independent from the sequence number of a package of each frame or the video timestamp of the image capturing device and thus cannot be modified by a common image processing process.

More specifically, in one application example, a watermark is added in an image of a frame each time the image capturing device captures the image of the frame. By means of adding low-frequency ripples in the image of the frame, the identity and the time parameter of the image capturing device are embedded into the image of the frame, such that the watermark still exists although the supplemental enhancement information may be lost after the image of the frame is processed by re-capturing or code conversion. Thus, the source of the image can be traced according to the identity of the image capturing device in the watermark.

To be compatible to the technology of the watermark, the time parameter includes high-bit data and low-bit data, wherein the high-bit data and the watermark have the same timestamp, whereas the timestamp continuously increases. For example, the time parameter includes four-byte data, wherein the first two high-bytes and the watermark have the same timestamp, and the timestamp of the two low-bytes continuously increases, and the low bit continuously increases from 0 when the high bit increases by one.

The time parameter in the watermark is capable of assisting to a certain extent in verifying whether the image has undergone modification. If the time parameter obtained from the watermark is not consecutive with the time parameter obtained from the watermark of the image of a previous image. For example, if the time parameter of the image of a next frame is smaller than the time parameter of the image of a previous frame, it can be determined that the image has been modified, e.g., by splicing or layering; if the time parameter of the image of a next frame is greater than the time parameter of the image of a previous frame and a difference between the two is greater than a predetermined threshold (e.g., 50), it can be determined that the part between the previous and next frame is likely deleted, or if the difference between the two is smaller than the predetermined threshold, it is likely that data between the images of the two frames is lost due to a poor network environment.

In other embodiments, a watermark may be added in an image of a frame randomly selected from images of multiple frames, or be added in a predetermined image, and is not specifically defined herein.

In step S102, the image of the at least one frame added with the watermark is compressed to obtain the compressed image of the at least one frame.

More specifically, in one application example, the image of the at least one frame added with the watermark is encoded and compressed. The encoding and compression method may be a method specified by the H.264 or H.265 protocol, so as to form the compressed image of the at least one frame to further subsequently generate the supplemental enhancement information. In other embodiments, the encoding and compression method may also be other methods according actual requirements, and is not specifically defined herein.

This embodiment may be combined with the method for preventing image modification according to any one of the second to sixth embodiments or a non-conflicting combination thereof.

Figure 11:
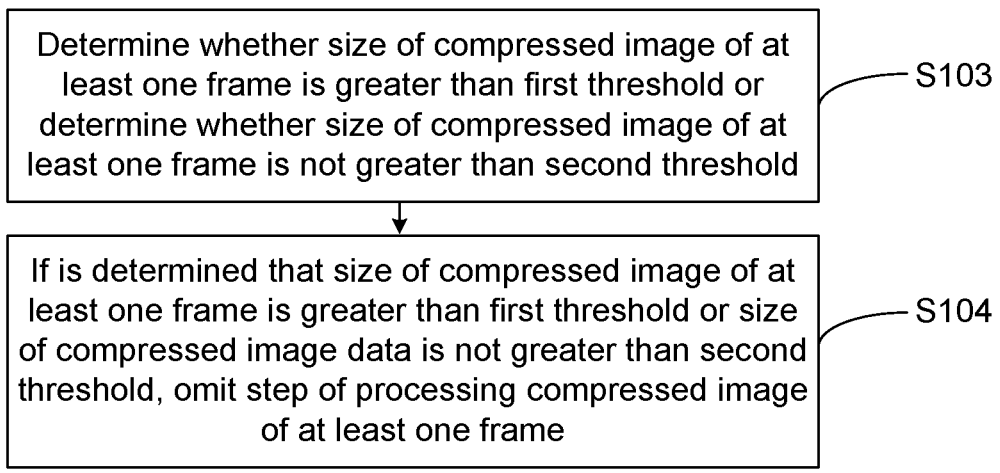
FIG. 11 s a flowchart of a method for preventing image modification according to an eighth embodiment of the present invention.

As shown in FIG. 11, a method for preventing image modification according to an eighth embodiment is based on the method for preventing image modification according to the first embodiment. Before step S11, the method for preventing image modification of this embodiment further includes the following steps.

In step S103, it is determined whether a size of the compressed image of the at least one frame is greater than a first threshold, or it is determined whether the size of the compressed image of the at least one frame is not greater than a second threshold.

In step S104, if the determination result indicates that the size of the compressed image of the at least one frame is greater than the first threshold or indicates that the size of the compressed image of the at least one frame is not greater than the second threshold, the step of processing the compressed image of the at least one frame is omitted.

The first threshold is a predetermined maximum size of the compressed image that does not trigger step S11, and the second threshold is a predetermined minimum size of the compressed image that does not triggering step S11. The first threshold and the second threshold may be configured according to actual requirements, and are not specifically defined herein.

More specifically, in one application example, before the checksum of the compressed image of the at least one frame is calculated, the size of the compressed image of the at least one frame is first determined, i.e., determining whether the storage space needed and occupied by the compressed image of the at least one frame is greater than the first threshold, e.g., determining whether the CFDS is greater than or equal to 0xFFFFFF. If the determination result indicates that storage space occupied by the compressed image of the at least one frame is greater than the first threshold, it means that the compressed image is quite large. At this point, if the subsequent step of calculating the checksum is performed, the calculation process may be slow, which severely affects the processing efficiency of the device. However, the above situation is not a common occurrence. Thus, if the size of the compressed image of the at least one frame is greater than the first threshold, the subsequent step of calculating the checksum is omitted, i.e., step S11 is omitted.

In another application example, before the checksum of the compressed image of the at least one frame is calculated, it is first determined whether the size of the compressed image of the at least one frame, i.e., the storage space needed and occupied by the compressed image of the at least one frame, is not greater than the second threshold, e.g., determining whether the CFDS is smaller than equal to 32. If the determination result indicates that the storage space needed and occupied by the compressed image of the at least one frame is not greater than the second threshold, it means that the compressed image is quite small. That is to say, there is little dummy data in the compressed image and the probability of receiving a malicious attack is also quite small. If the subsequent step of calculating the checksum is still performed, due to the small amount of data, the calculation method having a higher risks of leaking the checksum is contrarily unfavorable for verifying the authenticity of the image data. Thus, if the size of the compressed image of the at least one frame is not greater than the second threshold, the subsequent step of calculating the checksum is omitted, i.e., step S11 is omitted.

When verifying the authenticity of the compressed image, if the size of the compressed image of the at least one frame is greater than the first threshold or if the size of the compressed image of the at least one frame is not greater than the second threshold, the subsequent step of calculating the checksum is omitted, and it is directly determined that the checksum of the compressed image of the at least one frame is correct.

This embodiment may be combined with the method for preventing image modification according to any one of the second to the seventh embodiments or a non-conflicting combination thereof.

Figure 12:
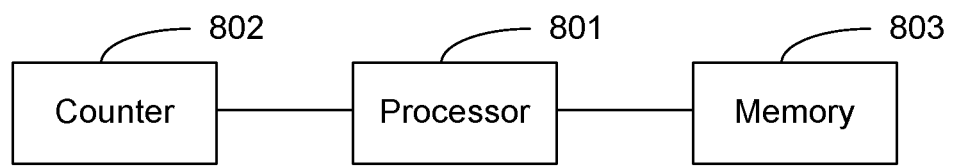
FIG. 12 is a structural schematic diagram of an image capturing device according to the first embodiment of the present invention.

As shown in FIG. 12, an image capturing device according to the first embodiment includes a processor 801 and a counter 802, wherein the counter 802 is connected to the processor 801.

The processor 801 controls the operations of the image capturing device, and may also be referred to as a central processing unit (CPU). The processor 801 may be an integrated circuit chip having signal processing capabilities. The processor 801 may also be a general purpose processor, a digital signal processor (DPS), an application-specific integrated circuit (ASIC), a field programmable gate array (FPGA), or other programmable devices, discrete gates, transistor logic devices or discrete hardware devices. The general purpose processor may be a microprocessor, or the processor may be any common processor.

The processor 801 processes the compressed image of the at least one frame to obtain feature data of the compressed image of the at least one frame, encrypts the feature data to generate a checksum, and generates supplemental enhancement information that at least includes a time parameter and the checksum, and transmits and/or stores the supplemental enhancement information and the compressed image of the at least one frame together, so as to use the supplemental enhancement information to verify authenticity of the compressed image of the at least one frame.

The time parameter is a counter value of the counter 802, and the counter value continuously increases. The time parameter records the order and time (in seconds) of each frame captured by the image capturing device, and is independent from the sequence number of a package of each frame or the video timestamp of the image capturing device and thus cannot be modified by a common image processing process.

More specifically, in one application example, the time parameter increases as the number of image frames of captured by the image capturing device increases. For example, the counter value increases by one each time the image of one frame is captured, such that the time parameter of the compressed images of multiple consecutive frames continuously increases. The counter value may also be configured to increase by a predetermined value each time, e.g., by two or by three.

The processor 801 obtains the counter value of the counter 802, i.e., the time parameter, after dividing the compressed image of the at least one frame, extracting the feature data and generating the checksum, and uses the data obtained by sorting the sequences of the checksum and the time parameter or by combining the checksum and the time parameter according to a predetermined format as the supplemental enhancement data, or uses ciphertext obtained from encrypting the checksum and the time parameter together as the supplemental enhancement information.

In other embodiments, the supplemental enhancement information may further include other data such as the size information of the compressed image of the at least one frame, an identity of the image capturing device and a customer identity. Associated details can be referred from the description of the supplemental enhancement information in FIG. 9, and a specific process of using the supplemental enhancement information to verify the authenticity of the compressed image can be referred from the description of the method for preventing image modification according to the first embodiment of the present invention; such repeated details are omitted herein.

The specific process of how the processor 801 processes the compressed image and generates the supplemental enhancement information can be referred from the method for preventing image modification according to any one of the first to eighth embodiments or a non-conflicting combination thereof, and such repeated details are omitted herein.

In other embodiments, the memory 803 stores data or instructions to be executed by the processor 801; for example, the checksum and the time parameter can be stored in the memory 803.

The memory 803 may include a read-only memory (ROM), a random access memory (RAM), a flash memory, a hard drive or an optic disk.

The image capturing device may be an IPCAM, or may be a common camera, such as a cell phone or a surveillance camera, or may be some components integrated in the image capturing device, e.g., an image processing chip.

In other embodiments, the image capturing device may further include a communication circuit, and the image capturing device may transmit the compressed image and the supplemental enhancement information through the communication circuit.

In this embodiment, in the image capturing device, a processor processes a compressed image of at least one frame, obtains feature data of the compressed image of the at least one frame, encrypts the feature data to generate a checksum, generates supplemental enhancement information that at least includes a time parameter and the checksum, and finally transmits and/or stores the supplemental enhancement information and the compressed image of the at least one frame together, so as to use the supplemental enhancement information to verify the authenticity of the compressed image of the at least one frame. The time parameter is a counter value of a counter in the image capturing device, and the counter value continuously increases. Thus, verification staff is enabled to verify the authenticity of the image data through verifying the checksum and the time parameter in the supplemental enhancement information.

Figure 13:
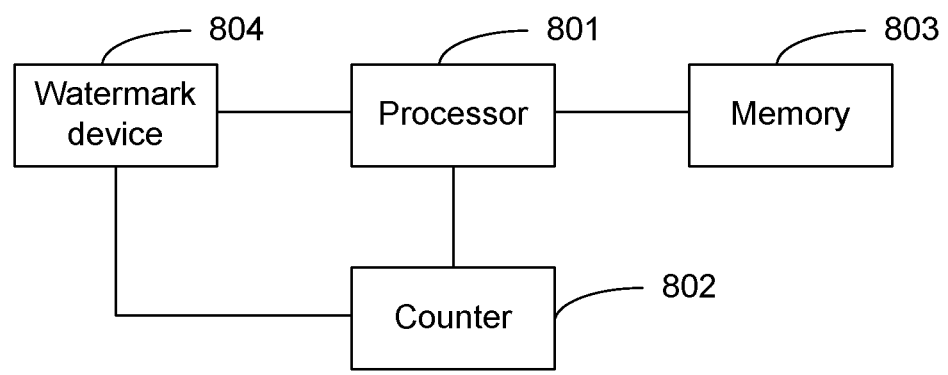
FIG. 13 is a structural schematic diagram of an image capturing device according to the second embodiment of the present invention.

As shown in FIG. 13, the image capturing device according to the second embodiment of the present invention is based on the image capturing device according to the first embodiment, and further includes a watermark device 804. The watermark device 804 is connected to the processor 801, and is for adding a watermark in the image of the at least one frame, wherein the watermark includes the identity of the image capturing device and the counter value of the counter 802.

More specifically, in one embodiment, the watermark device 804 adds the watermark in the frame image each time after the image capturing device captures the image of one frame, e.g., data points are added at certain predetermined positions of the image, pixel values at certain predetermined positions are modified, or low-frequency ripples are added in the image, so as to embed the identity of the image capturing device and the counter value of the counter 802 as watermark information, for the processor 801 to subsequently process the compressed image and to generate the supplemental enhancement information.

The specific operation process and the function of the watermark device 804 as well as the format of the time parameter can be referred from the description of the method for preventing image modification according to the seventh embodiment of the present invention; the specific operation processes of the processor 801 and the counter 802 may be referred from the image capturing device according to the first embodiment of the present invention; such repeated details are omitted herein.

In other embodiments, the image capturing device may further include a memory 803, which may be used to store the identity of the image capturing device.

Figure 14:
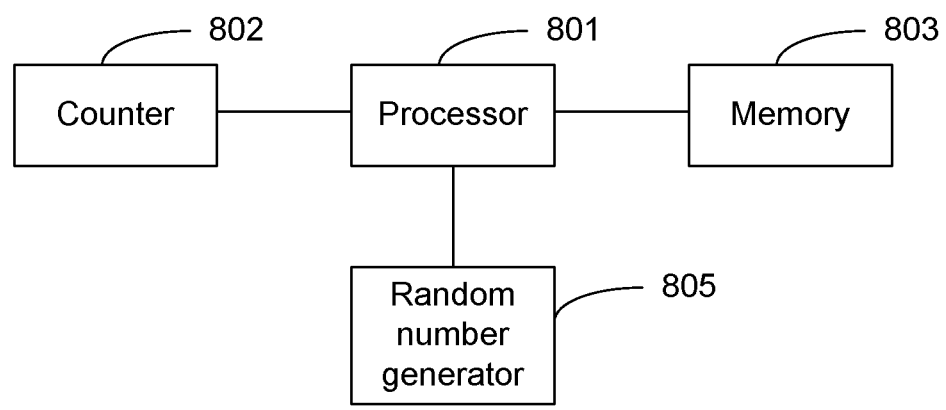
FIG. 14 is a structural schematic diagram of an image capturing device according to the third embodiment of the present invention.

As shown in FIG. 14, an image processing device according to the third embodiment of the present invention is based on the image processing device according to the first embodiment, and further includes a random number generator 805. The random number generator 805 is connected to the processor 801, and is for randomly generating an offset, such that the processor 801 processes the compressed image of the at least one frame by using the offset.

More specifically, in one application example, the random number generator 805 may use a random function "rand( )" to generate a random number, and select five least significant bits of the random number as the offset. The processing unit 801 may divide the compressed image of the at least one frame by using the offset, and combine the offset with the time parameter and the check sum to generate the supplemental enhancement information. In other application examples, the bit number of the random number may also be other values, e.g., 6 bits, and the random number generator 805 may adopt other methods, e.g. using the last few digits of measured atmospheric noise or temperature as the random number, and the method adopted by the random number generator 805 is not specifically defined herein.

The specific operation processes of the processor 801 and the counter 802 may be referred from the description of the image capturing device according to the first embodiment of the present invention, and such repeated details are omitted herein.

In other embodiments, the image capturing device may further include a memory 803 which may be used to store the random offset, and the image capturing device may further include a watermark device 804. Details of the watermark device 804 can be referred from the description of the watermark device in the image capturing device according to the second embodiment of the present invention, and are omitted herein.

Figure 15:
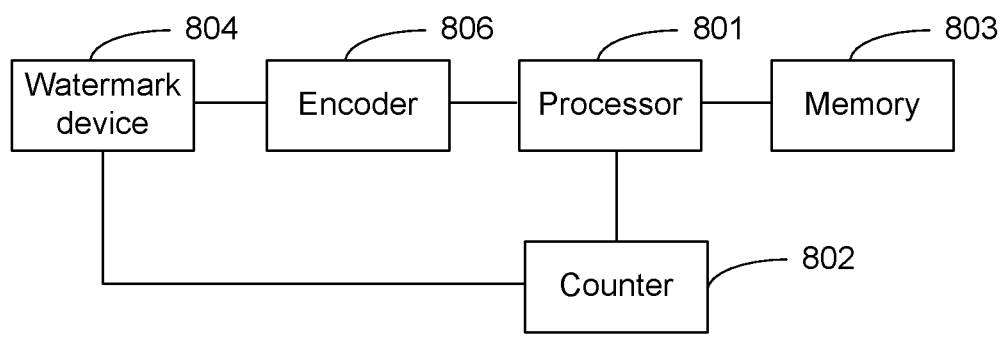
FIG. 15 is a structural schematic diagram of an image capturing device according to the fourth embodiment of the present invention.

As shown in FIG. 15, an image capturing device according to the fourth embodiment of the present invention is based on the image capturing device according to the second embodiment, and further includes an encoder 806. The encoder 806 is connected to the processor 801, and is for compressing and encoding the image to generate a compressed image.

The encoder 806 is further connected to the watermark device 804. After the watermark device 804 adds the watermark in the image, the encoder 806 encodes and compresses the image added with the watermark to generate the compressed image, and transmits the compressed image to the processor 801. The processor 801 processes the compressed image to generate the supplemental enhancement information.

The encoding method adopted by the encoder 806 may be a method specified by the H.264 or H.265 protocol, or may be other methods according to actual requirements and is not specifically defined herein.

The specific operation processes of the processor 801 and the counter 802 may be referred from the description of the image capturing device according to the first embodiment of the present invention, and the specific operation process of the watermark device 804 may be referred from the image capturing device according to the third embodiment of the present invention; such repeated details are omitted herein.

The image capturing device may further include a random number generator. Details of the random number generator may be referred from the description of the image capturing device according to the fourth embodiment of the present invention, and are omitted herein.

In other embodiments, the image capturing device may further include other elements such as, for example but not limited to, a display screen or press buttons.

Figure 16:
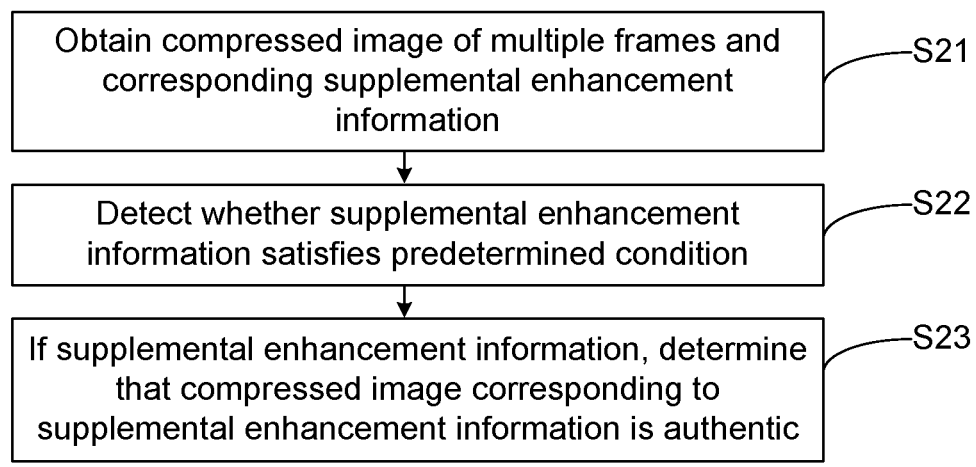
FIG. 16 is a flowchart of an image verification method according to the first embodiment of the present invention.

As shown in FIG. 16, an image verification method according to the first embodiment includes the following steps.

In step S21, compressed image data of multiple frames and corresponding supplemental enhancement information are obtained.

The supplemental enhancement information includes a time parameter and a corresponding checksum generated from encrypting the compressed images. The time parameter is a counter value of a counter in an image capturing device, and the counter value continuously increases.

The time parameter records the order and time (in seconds) of each frame captured by the image capturing device, and is independent from the sequence number of a package of each frame or the video timestamp of the image capturing device and thus cannot be modified by a common image processing process.

In step S22, it is detected whether the supplemental enhancement information satisfies a predetermined condition.

The predetermined condition may be a predetermined value or condition of the time parameter and the checksum in the predetermined supplemental enhancement information, e.g., whether the time parameters of a previous frame and a next frame are consecutive or the checksum is pre-calculated.

In other embodiments, the predetermined condition may be adding other values or conditions to the data in the supplemental enhancement information, and is not specifically defined herein.

In step S23, if the supplemental enhancement information satisfies the predetermined condition, it is determined that the compressed image corresponding to the supplemental enhancement information is authentic.

More specifically, in one application example, a compressed of one frame corresponds to one set of supplemental enhancement information, and an image verification device detects whether the time parameters corresponding to compressed images of a previous frame and a next frame are consecutive. It the time parameters are consecutive, it means that the compressed images of the previous and next frames are consecutively captured; if the time parameters are not consecutive, and a difference between the time parameters is greater than a predetermined threshold (e.g., 50), it means that the part between the previous and next frames is likely deleted, or if the difference between the time parameters is smaller than the predetermined threshold, it is likely that data between the previous and next frames is lost due to a poor network environment.

In the above application example, if the time parameters corresponding to the compressed images of the previous and next frames are consecutive, the checksum of the compressed image of each frame can be inspected. For example, assuming that the checksums of the compressed images of the frames received include four checksums, it is determined that the compressed image of the frame is authentic if the four checksums are consistent with the check sum in the supplemental enhancement information; it is possible that the compressed image of the frame has been modified if the checksums are inconsistent.

In other embodiments, compressed images of multiple frames may also correspond to one set of supplemental enhancement information, which may further include other data such as version information and is not specifically defined herein.

In this embodiment, by using the compressed image and the supplemental enhancement information, the authenticity of the compressed image can be verified, thus increasing the utilization value of the image data or image.

Figure 17:
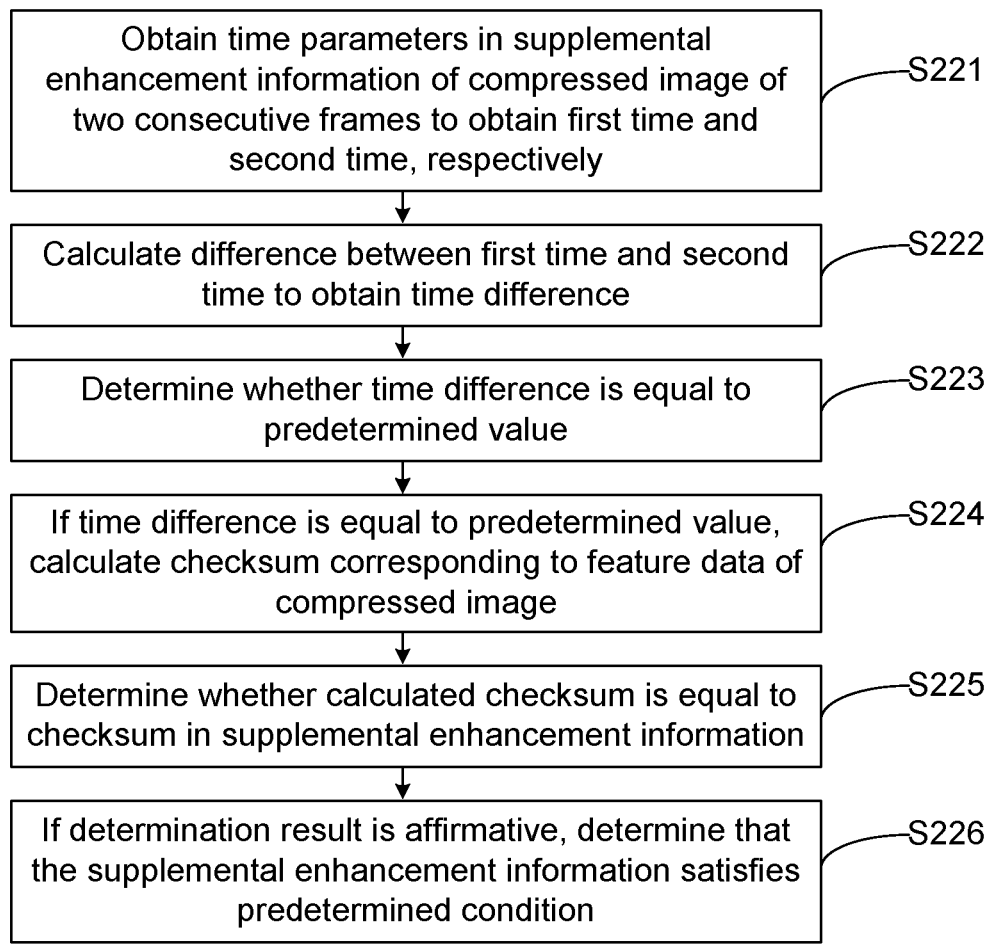
FIG. 17 is a flowchart of an image verification method according to the second embodiment of the present invention.

As shown in FIG. 17, an image verification method according to the second embodiment of the present invention is based on the image verification method according to the first embodiment of the present invention. In this embodiment, step S22 further includes the following steps.

In step S221, time parameters in the supplemental enhancement information of the compressed images of a previous frame and a next frame that are consecutive are obtained to respectively obtain a first time and a second time.

In step S222, a difference between the first time and the second time is calculated to obtain a time difference.

In step S223, it is determined whether the time difference is equal to a predetermined value.

The predetermined value may be a difference between the time parameters of the compressed images of two predetermined consecutive frames, and a specific value thereof can be configured according to actual requirements and is not specifically defined herein.

More specifically, in one application example, a compressed image of each frame corresponds to one set of supplemental enhancement information, the first time is the time parameter in the supplemental enhancement information of the compressed image of the previous frame, and the second time is the time parameter in the supplemental enhancement information of the compressed image of the next frame. Because the time parameter continuously increases, e.g., the time parameters corresponding to compressed images two consecutive frames are consecutive, between the compressed image of the two consecutive frames, when the time parameter of the compressed image of the next frame is greater than the time parameter of the compressed image of the previous frame by one, i.e., the difference between the first time and the second time is one, it means that no data is lost between the compressed images of the two consecutive frames received, or no modification has been made to the data between the images of the two frames.

In other application examples, the time difference between two consecutive frames may also be other values, e.g., two or four.

In step S224, if the time difference is equal to the predetermined value, the checksum corresponding to the feature data of the compressed image is calculated.

In step S225, if is determined whether the obtained checksum is equal to the checksum in the supplemental enhancement information.

In step S226, if the determination result is affirmative, it is determined that the supplemental enhancement information satisfies the predetermined condition.

More specifically, in the above application example, when the time difference is equal to one, by regarding the first byte of the compressed image receive as a starting point, or by regarding the last byte of the compressed image received as a starting point, and according to a predetermined dividing method, e.g., the same dividing method as that of the camera device, the compressed image is divided, feature data is extracted, the checksum corresponding to the feature data is calculated, wherein the checksum includes four checksums, and the four checksums are compared with the four checksums in the supplemental enhancement information. If the four checksums are consistent, it is determined that the supplemental enhancement information satisfies the predetermined condition; if the checksums are inconsistent, it means that it is likely that the compressed image has been modified.

Figure 18:
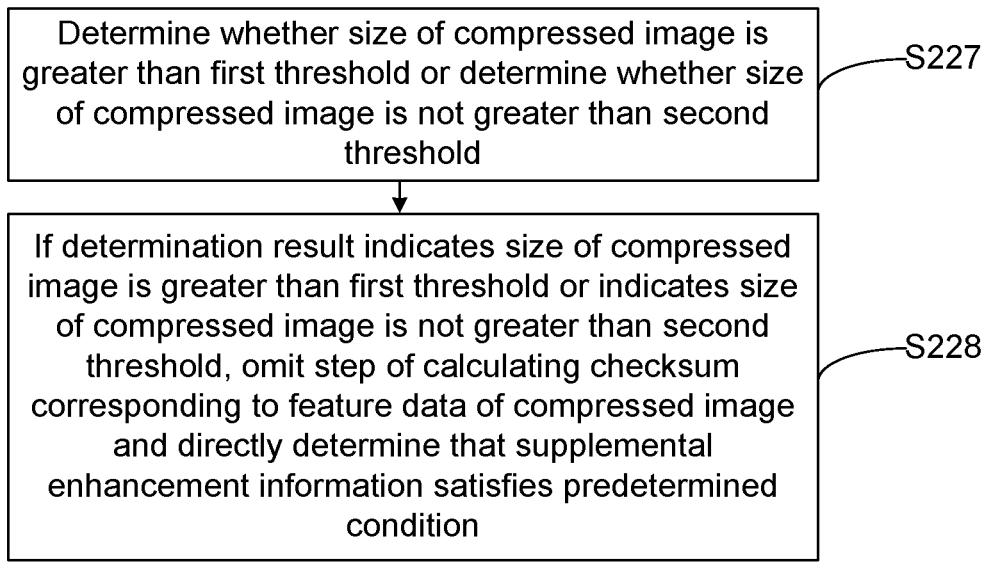
FIG. 18 is a flowchart of an image verification method according to the third embodiment of the present invention.

As shown in FIG. 18, an image verification method according to the third embodiment of the present invention is based on the image verification method according to the second embodiment of the present invention. In this embodiment, the supplemental enhancement information further includes size information of the corresponding compressed image, and the method further includes the following steps before step S224.

In step S227, it is determined whether the size of the compressed image is greater than a first threshold, or it is determined whether the size of the compressed image is not greater than a second threshold.

The first threshold is a predetermined maximum size of the compressed image that does not trigger step S224, and the second threshold is a predetermined minimum size of the compressed image not trigger step S224. The first threshold and the second threshold may be configured according to actual requirements, and are not specifically defined herein.

In step S228, if it is determined that the size of the compressed image is greater than the first threshold, or it is determined that the size of the compressed image is not greater than the second threshold, the step of calculating the checksum corresponding to the feature data of the compressed image is omitted, and it is directly determined that the supplemental enhancement information satisfies the predetermined condition.

More specifically, in one application example, before the checksum of the compressed image is calculated, the size of the compressed image of the at least one frame is first determined, e.g., determining whether the CFDS is greater than or equal to 0xFFFFFF. If the determination result indicates that storage space occupied by the compressed image of the at least one frame is greater than the first threshold, it means that the compressed image is quite large. At this point, if the subsequent step of calculating the checksum is performed, the calculation process may be slow, which severely affects the processing efficiency of the device. However, the above situation is not a common occurrence. Thus, if the size of the compressed image of the at least one frame is greater than the first threshold, the subsequent step of calculating the checksum is omitted, i.e., step S224 is omitted, and it is directly determined that the supplemental enhancement information satisfies the predetermined condition.

In another application example, before the checksum of the compressed image of the at least one frame is calculated, it is first determined whether the size of the compressed image of the at least one frame, i.e., the storage space needed and occupied by the compressed image of the at least one frame, is not greater than the second threshold, e.g., determining whether the CFDS is smaller than equal to 32. If the determination result indicates that the storage space needed and occupied by the compressed image of the at least one frame is not greater than the second threshold, it means that the compressed image is quite small. That is to say, there is little dummy data in the compressed image and the probability of receiving a malicious attack is also quite small. If the subsequent step of calculating the checksum is still performed, due to the small amount of data, the calculation method of a higher risks of leaking the checksum is contrarily unfavorable for verifying the authenticity of the image data. Thus, if the size of the compressed image of the at least one frame is not greater than the second threshold, the subsequent step of calculating the checksum is omitted, i.e., step S224 is omitted, and it is directly determined that the supplemental enhancement information satisfies the predetermined condition.

In other embodiments, the supplemental enhancement information may further include other data. Specific details may be referred from the structure shown in FIG. 9, and the supplemental enhancement information may be further used to verify the state of the frame image.

Figure 19:
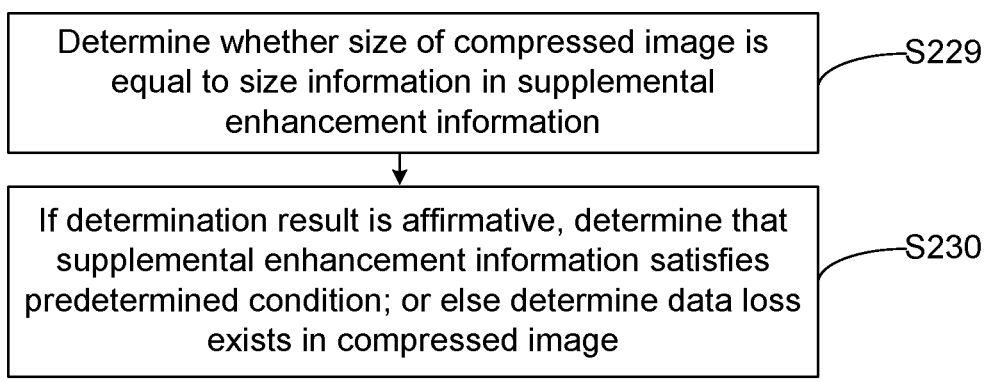
FIG. 19 is a flowchart of an image verification method according to the fourth embodiment of the present invention.

As shown in FIG. 19, an image verification method according to the fourth embodiment of the present invention is based on the image verification method according to the third embodiment of the present invention, and further includes the following steps before step S227.

In step S229, it is determined whether the size of the compressed image is equal to the size information of the compressed image in the supplemental enhancement information.

In step S230, if the determination result is affirmative, it is determined that the supplemental enhancement information satisfies the predetermined condition; if the determination result is negative, it is determined that data loss exists in the compressed image.

More specifically, the supplemental enhancement information includes the size information corresponding to the compressed image, i.e., the storage space needed and occupied by the compressed image. If the size of the compressed image received is consistent with the size information, the checksum of the compressed image can be calculated by regarding the first byte of the compressed image as the starting point. When the check sum is also consistent with the checksum in the supplemental enhancement information, it can be determined that the supplemental enhancement information satisfies the predetermined condition, that is, the compressed image is authentic. If the size of the compressed image received is inconsistent with the size information but the checksum is consistent, data loss exists in the compressed image. If neither of the size and the checksum is consistent, it means that the compressed image has been modified.

Figure 20:
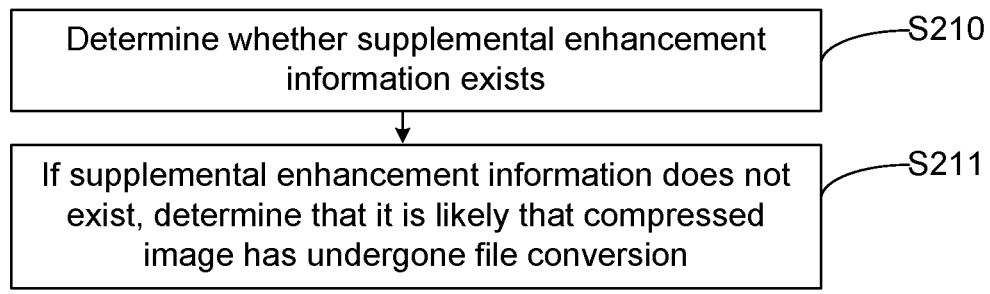
FIG. 20 is a flowchart of an image verification method according to the fifth embodiment of the present invention.

As shown in FIG. 20, an image verification method according to the fifth embodiment of the present invention is based on the image verification method according to the first embodiment of the present invention, and further includes the following steps before step S22.

In step S210, it is determined whether the supplemental enhancement information exists.

In step S211, if the supplemental enhancement information does not exist, it is determined that the compressed image may have undergone file conversion.

More specifically, in one application example, a compressed image of at least one frame corresponds to one set of supplemental enhancement information, and the supplemental enhancement information may get lost after the image undergoes file conversion or re-capturing if file conversion or re-capturing operations are performed by a device that is not configured with supplemental enhancement information. Therefore, if the supplemental enhancement information corresponding to a compressed image does not exist in data received, it can be determined that the compressed image has undergone file conversion or re-capturing.

To verify images of multiple frames, e.g., to verify images of frames played, transmitted or captured within one second, if the time parameter of the image of any of the frames and the time parameter of the image of a previous frame are not consecutive, it means that the image data within that second is not consecutive and it is then determined that the image data within that one second has been modified, e.g., by deleting, cutting and pasting operations. Among images of multiple frames, if data of an image of one frame is lost, data loss exists in the image data within that one second; if data loss has been determined to exist in images of multiple consecutive frames and multiple consecutive checksums are inconsistent, it can be determined that it is likely that the image data has been modified.

In other embodiments, the supplemental enhancement information may further include an identity of the image capturing device and a customer identity. In the image data within one second, among images of multiple frames, if the identity of the image capturing device and the customer identity in the supplemental enhancement information received are consistent with the identity of the image capturing device and the customer identity using the image capturing device, it means that it is likely that the image data received has been modified.

Figure 21:
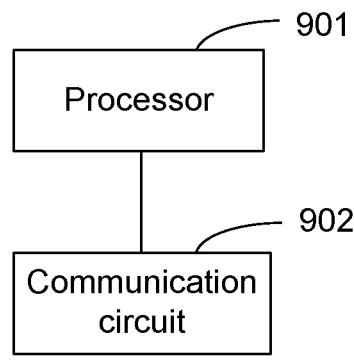
FIG. 21 is a structural schematic diagram of an image capturing device according to an embodiment of the present invention.

As shown in FIG. 21, an image verification device according to an embodiment of the present invention includes a processor 901 and a communication circuit 902 connected to each other.

The communication module 902 is used to communicate with an external device, and compressed images of multiple frames and corresponding supplemental enhancement information can be obtained through the communication module 902. The communication module 902 includes an antenna, a communication interface or a communication chip.

The processor 901 obtains the compressed images of the multiple frames and the corresponding supplemental enhancement information through the communication circuit 902, detects whether the supplemental enhancement information satisfies a predetermined conditions, and determines that the compressed image data corresponding to the supplemental enhancement information is authentic when the supplemental enhancement information satisfies the predetermined condition.

The specific operation process of the processor 901 may be referred from the description of the image verification method according to any one of the first to fifth embodiments and a non-conflicting combination thereof, and such repeated details are omitted herein.

In other embodiments, the image verification device may further include a memory, which stores data or instructions that need to be executed by the processor 901. For example, the compressed image and the supplemental enhancement information may be stored in the memory.

The image verification device may be a device such as a cell phone, a computer, a tablet or a server, or may be a component such as a chip, and is not specifically defined herein.

Figure 22:
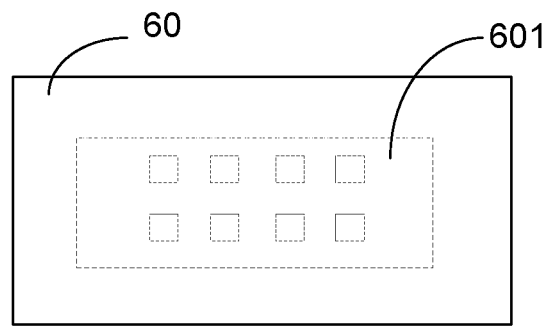
FIG. 22 is a structural schematic diagram of a device having a storage function according to the first embodiment of the present invention.

As shown in FIG. 22, in a device having a storage function according to the first embodiment of the present invention, a device 60 having a storage function stores therein a program 601, which can be executed to realize the method for preventing image modification according to any one of the first to eighth embodiments of the present invention or a non-conflicting combination thereof.

The device 60 having a storage function may be, for example but not limited to, a portable storage medium such as a portable drive, an optical disk, or a terminal, a server or an independent component that can be integrated in a terminal, such as a baseband chip.

Figure 23:
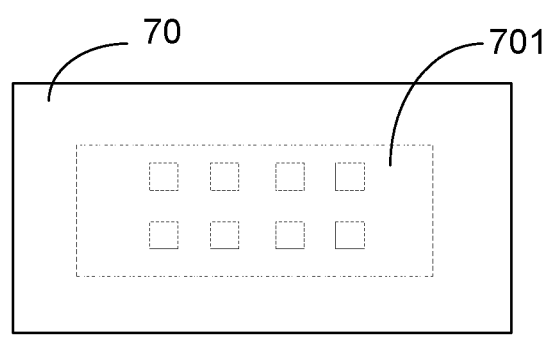
FIG. 23 is a structural schematic diagram of a device having a storage function according to the second embodiment of the present invention.

As shown in FIG. 23 showing a device having a storage function according to the second embodiment of the present invention, the device 70 having a storage function stores therein a program 701, which can be executed to realize the image verification method according to any one of the first to fifth embodiments or a non-conflicting combination thereof.

The device 70 having a storage function may be, for example but not limited to, a portable storage medium such as a portable drive, an optical disk, or a terminal, a server or an independent component that can be integrated in a terminal, such as a baseband chip.

While the invention has been described by way of example and in terms of the preferred embodiments, it is to be understood that the invention is not limited thereto. On the contrary, it is intended to cover various equivalent modifications and similar arrangements and procedures as well as direct and indirect applications to other related technical fields, and the scope of the appended claims therefore should be accorded with the broadest interpretation so as to encompass all such modifications and similar arrangements and procedures.

What is claimed is:

1. A method for preventing image modification, comprising:

processing a compressed image of at least one frame to obtain at least one set of first feature data and second feature data from at least two sub image blocks;

encrypting the at least one set of the first feature data and the second feature data to generate at least two corresponding sub checksums, and combining the at least two corresponding sub checksums to generate a checksum;

generating supplemental enhancement information, the supplemental enhancement information at least comprising a time parameter and the checksum; and storing or transmitting the supplemental enhancement information and the compressed image of the at least one frame together, so as to use the supplemental enhancement information to verify authenticity of the compressed image of the at least one frame;

wherein the compressed image of the at least one frame is divided by using a randomly generated offset to obtain the at least two sub image blocks having different sizes; and wherein, the time parameter is a counter value of a counter in an image capturing device, and the counter value continuously increases.

2. The method for preventing image modification according to claim 1, wherein, the at least two sub image blocks comprise a first sub image block and a second sub image block, and the size of the first sub image block is greater than the size of the second sub image block by a predetermined number of the randomly generated offset.

3. The method for preventing image modification according to claim 2, wherein the supplemental enhancement information further comprises the randomly generated off set.

4. The method for preventing image modification according to claim 2, wherein the at least two sub image blocks are from the compressed image of the same frame, or the at least two sub image blocks are from the compressed image of at least two frames.

5. The method for preventing image modification according to claim 1, before the step of extracting the feature data from each of the at least two sub image blocks, the method further comprises:
selecting the at least two sub image blocks from the compressed images of at least two frames.

6. The method for preventing image modification according to claim 1, wherein the step of generating the supplemental enhancement information comprises:
encrypting the time parameter and the checksum to generate ciphertext; and
generating the supplemental enhancement information, the supplemental enhancement information comprising the ciphertext.

7. The method for preventing image modification according to claim 1, wherein the supplemental enhancement information further comprises size information of the compressed image of the at least one frame and an identity of the image capturing device.

8. The method for preventing image modification according to claim 1, before the step of processing the compressed image of the at least one frame, the method further comprising:
adding a watermark in an image of the at least one frame; and
compressing the image of the at least one frame added with the watermark to obtain the compressed image of the at least one frame;
wherein, the watermark comprises an identity of the image capturing device and the time parameter.

9. The method for preventing image modification according to claim 8, wherein the time parameter comprises high-bit data and low-bit data, the high-bit data and the low-bit data have a same timestamp, and the low-bit data continuously increases.

10. The method for preventing image modification according to claim 1, wherein the supplemental enhancement information further comprises version information and a customer identity.

11. The method for preventing image modification according to claim 1, before the step of processing the compressed image of the at least one frame, the method further comprising:
determining whether a size of the compressed image of the at least one frame is greater than a first threshold or determining whether the size of the compressed image of the at least one frame is not greater than a second threshold;
omitting the step of processing the compressed image of the at least one frame if a determination result indicates that the size of the compressed image of the at least one frame is greater than the first threshold or indicates that the size of the compressed image of the at least one frame is not greater than the second threshold.

12. An image capturing device, comprising:
a processor and a counter, the counter connected to the processor;
a random number generator, connected to the processor, for randomly generating an offset for the processor to process a compressed image of at least one frame by using the randomly generated offset;
wherein, the processor divides the compressed image of the at least one frame using the randomly generated offset to obtain at least two sub image blocks having different sizes, obtains at least one set of first feature data and second feature data from the at least two sub image blocks, encrypts the at least one set of the first feature data and the second feature data to generate at least two corresponding sub checksums, and combining the at least two corresponding sub checksums to generate a checksum, generates supplemental enhancement information that at least comprises a time parameter and the checksum, and stores or transmits the supplemental enhancement information and the compressed image of the at least one frame together, so as to use the supplemental enhancement information to verify authenticity of the compressed image of the at least one frame; and
wherein the time parameter is a counter value of the counter, and the counter value continuously increases.

13. The image capturing device according to claim 12, further comprising:
a watermark device, connected to the processor, adding a watermark in an image of the at least one frame, the watermark comprising an identity code of the image capturing device and the counter value of the counter.

14. The image capturing device according to claim 12, wherein the at least two sub image blocks comprise a first sub image block and a second sub image block, and the size of the first sub image block is greater than the size of the second sub image block by a predetermined number of the randomly generated offset.

15. The image capturing device according to claim 12, further comprising:
an encoder, connected to the processor, compressing and encoding an image to generate the compressed image.

16. An image verification method, comprising:
obtaining a compressed image of a plurality of frames and corresponding supplemental enhancement information;
randomly generating an offset;
dividing the compressed image of at least one frame using the randomly generated offset to obtain at least two sub image blocks of different sizes;
detecting whether the supplemental enhancement information satisfies a predetermined condition;
determining that the compressed image corresponding to the supplemental enhancement information is authentic if the supplemental enhancement information satisfies the predetermined condition;
wherein, the supplemental enhancement information comprises a first checksum generated from encrypting a time parameter and the compressed image, the time parameter is a counter value of a counter of an image capturing device, and the counter value continuously increases; and wherein the first checksum is generated by combining at least two corresponding sub checksums, the at least two corresponding sub checksums are generated by encrypting at least one set of first feature data and second feature data, and the at least one set of the first feature data and the second feature data is obtained from the at least two sub image blocks.

17. The image verification method according to claim 16, wherein the step of detecting whether the supplemental enhancement information satisfies the predetermined condition comprises:

obtaining a time parameter in the supplemental enhancement information of the compressed image of two consecutive frames comprising a previous frame and a next frame to obtain a first time and a second time, respectively;

calculating a difference between the first time and the second time to obtain a time difference;

determining whether the time difference is equal to a predetermined value;

calculating a second checksum corresponding to feature data of the compressed image if the time difference is equal to the predetermined value;

determining whether the second checksum calculated is equal to the first checksum in the supplemental enhancement information; and determining whether the supplemental enhancement information satisfies the predetermined condition if a determination result is affirmative.

18. The image verification method according to claim 17, before the step of calculating the second checksum corresponding to the feature data of the compressed image, further comprising:

determining whether a size of the compressed image is greater than a first threshold or determining whether the size of the compressed image is not greater than a second threshold; and omitting the step of calculating the second checksum corresponding to the feature data of the compressed image, and directly determining that the supplemental enhancement information satisfies the predetermined condition if a determination result indicates that the size of the compressed image is greater than the first threshold or indicates that the size of the compressed image data is not greater than the second threshold.

* * * * *